Nov. 28, 1967 S. SCHMIDT 3,355,626
CIRCUIT ARRANGEMENT FOR THE TRIGGERED DISCHARGE OF A CAPACITOR
Filed April 1, 1965 3 Sheets-Sheet 1

INVENTOR.
SIEGFRIED SCHMIDT
BY
AGENT

Nov. 28, 1967  S. SCHMIDT  3,355,626
CIRCUIT ARRANGEMENT FOR THE TRIGGERED DISCHARGE OF A CAPACITOR
Filed April 1, 1965  3 Sheets-Sheet 2

INVENTOR.
SIEGFRIED SCHMIDT
BY
AGENT

United States Patent Office 3,355,626
Patented Nov. 28, 1967

3,355,626
CIRCUIT ARRANGEMENT FOR THE TRIGGERED DISCHARGE OF A CAPACITOR
Seigfried Schmidt, Hamburg, Germany, assignor to North American Philips Company, Inc., New York, N.Y., a corporation of Delaware
Filed Apr. 1, 1965, Ser. No. 444,521
Claims priority, application Germany, Apr. 11, 1964, P 34,032
5 Claims. (Cl. 315—241)

A circuit for triggering a gaseous tube is provided with a capacitor connected across the main electrode path of the discharge tube and an inductor connected in series with the capacitor. An electronic switch supplies a charging current through the series combination of the inductor and the capacitor for a duration somewhat less than the full charge cycle of the capacitor. Prior to the capacitor reaching its maximum charge, the electronic switch interrupts the charging current. Since the capacitor was not fully charged at this point, interruption of the remaining charging current causes a voltage spike to appear across the inductor, which spike is conveyed to the ignition electrode of the gaseous discharge tube, igniting same, and allowing the capacitor to discharge through the main electrode path of the tube.

This invention relates generally to capacitive discharge devices and more particularly to the triggered discharge of a capacitor.

Capacitor discharges are used, for example, for producing flashes of light by means of sparks or gas discharge lamps (electronic flash) and for producing surges by means of sparks. The capacitor which contains the desired energy is preferably directly connected electrically with the discharge space, the maximum voltage at the capacitor remaining below the breakdown voltage of the discharge space. The discharge is introduced by means of an additional ignition voltage.

Immediately after a discharge the capacitor is charged again in known manner through a resistor or an inductor and a rectifier. In addition to a voltage doubling effect the inductive charge has the advantage that the renewed increase of the voltage at the capacitor, and consequently at the discharge space, occurs in the beginning considerably more slowly than in the case of resistance charge. Consequently, a longer period of time is available for de-ionization of the discharge space when the charging time is the same. This means that with inductive charging a higher recurrence frequency of the discharge can be reached without changing the properties of the discharge space.

When a further increase of the discharge recurrence frequency is to be reached, a controlled charge is used in known manner. In this case the control is effected so that the charge starts only after the de-ionization time, but then occurs very rapidly. This charge control is effected, for example, by means of electron tubes and thyratrons and the control is only effective at the beginning of the charge. The end of the charge is determined by the proportioning of the charge circuit and the rectifying behaviour of the control elements. The ignition pulse for initiating the discharge, however, has so far been produced by means of a separate circuit arrangement.

It is the prime object of this invention to provide an improved triggering circuit for a capacitive discharge.

It is a further object of this invention to provide an improved triggering circuit which controls both charge and ignition.

In accordance with the invention a circuit arrangement is provided for the triggered discharge of a capacitor through a gas discharge device, the capacitor being charged by means of a series arrangement of an electronic switch and a choke coil an ignition pulse for an ignition electrode of the discharge space is produced by interrupting the flow of charge current.

The control of the charge and the production of the ignition voltage are consequently performed by one unit, which has the following advantages:

Only one control element is required, which reduces the number of structural members. The ignition of the discharge occurs automatically a short time before the voltage at the operating capacitor reaches its maximum, so that only one signal is necessary for initiating a discharge cycle (charging and ignition). The highest charge voltage reached is only applied to the operating capacitor during a very short period of time, as result of which leakage losses do not occur. In addition, capacitors having a lower nominal voltage may be used.

The highest charging voltage reached is only applied to the discharge space, which is still blocking, during a very short period of time. Consequently, the safety distance to the spontaneous discharge can be reduced, so that the same discharge space can be operated at higher voltage. Furthermore, an inductive charge through a transformer is possible even without a rectifier in the secondary circuit. As a result of this, a matching of the control element to the required discharge voltage can be obtained at very small costs.

In order that the invention may readily be carried into effect, it will now be described in greater detail with reference to the drawing, which shows embodiments thereof.

Figure 1:
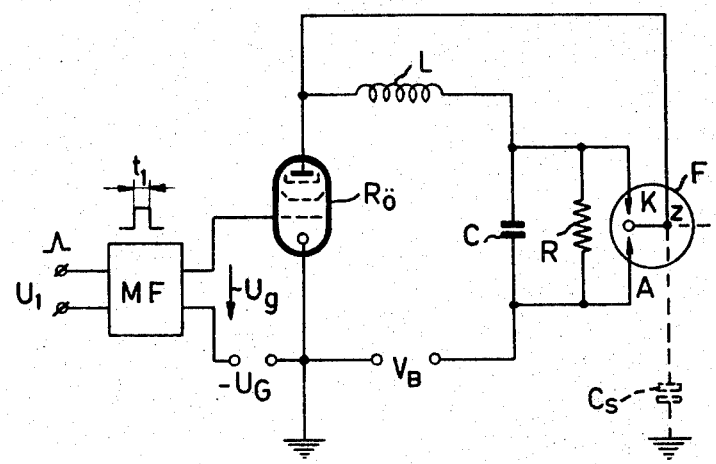
FIG. 1 shows a circuit arrangement with an electron tube.

Referring now to FIG. 1, the charging circuit consists of the inductor L, the electron tube Rö, the capacitor C, a resistor R and the voltage source $V_B$. The discharge space F consists, for example, of the cathode K, the anode A and the ignition electrode Z. In the rest condition the grid of the tube Rö attains a high negative voltage $-U_g$ sufficient to render the anode current substantially zero. The resistor R prevents the relatively small cut-off current from prematurely charging the capacitor which would impede a voltage doubling. The resistor is small enough so that the voltage drop across it remains negligibly small as a result of the cut-off current and yet large enough so that the discharge time constant R. C is large with respect to the charge time T/2, i.e. the resistor must be small with respect to the internal resistance of the cut-off tube and must be large with respect to the characteristic resistance of the charge circuit. These conditions can always be easily fulfilled.

By switching on the control element an inductive charge of the operating capacitor begins. A short time before this charge is completed, i.e. a short time before the charge current becomes zero, the control element and the electron tube Rö respectively are switched off. Switching-off is also possible a short time after the reversal of the current. The residual current in the charge inductor requires a high voltage across the control element, which is used for ignition of the discharge.

Figure 2A:
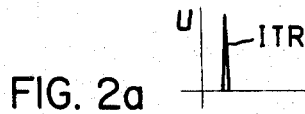
FIGS. 2a–2e are a diagram of the variations with time of currents and voltages.
Figure 2B:
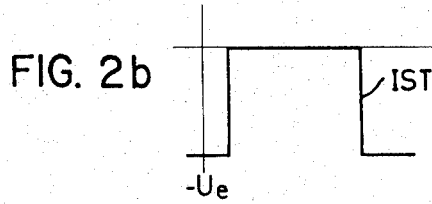
Figure 2C:
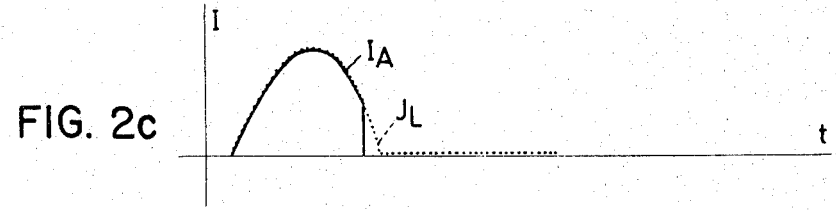
Figure 2D:
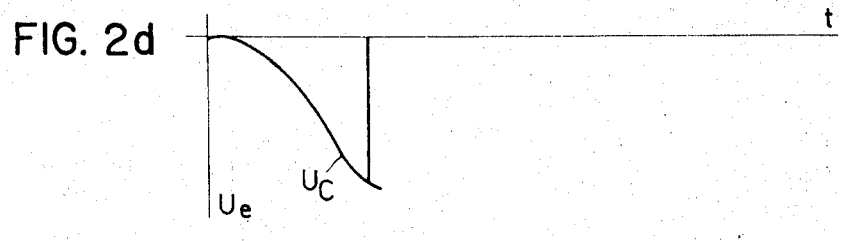

The resistor R may alternatively be connected directly from the battery $V_B$ to the anode of the tube Rö without varying the conditions. In this alternative, the maximum voltage at the resistor is only half as large. When a discharge is to be effected, a trigger pulse ITR (FIG. 2a) is applied to a pulse shaper, for example, a monostable trigger stage MF, which applies a control pulse IST (FIG. 2b) of the length $t_1$, for opening the tube Rö, to the grid. As soon as the tube is opened, the inductive charge of the capacitor through the coil L starts. The time variation of the anode current IA and of the coil current IL is shown in FIG. 2c while FIG. 2d shows the time variation of the voltage $U_C$ at the capacitor C. This charging is a production of oscillations having a duration $T=2\pi\sqrt{LC}$. Normally the charge is discontinued after a time $T/2$, when the coil current has become zero and wants to reverse its direction and the voltage at the capacitor C has reached its maximum with $U_C=2U_B$, by the cut-off action of a rectifier or a control element. So the switching off of the charging is not effected under control but by the reversal of the direction of current.

Figure 2E:
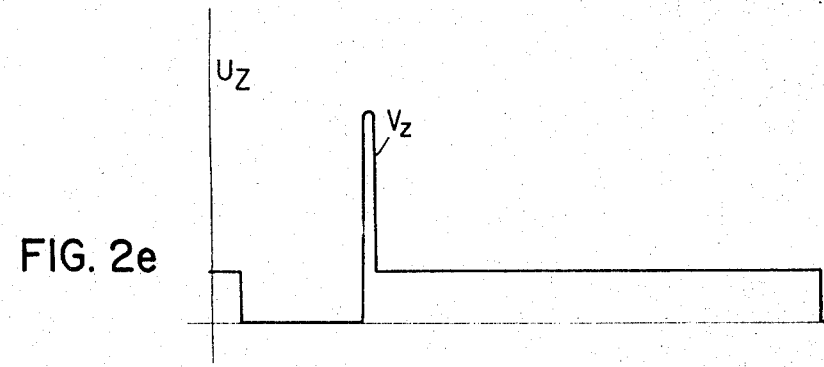

In the circuit arrangement according to the invention the charge $U_C$ (FIG. 2d) is discontinued by control of the electron tube Rö after the time $t_1<T/2$, at an instant at which a current $i_1$ still flows through the coil L. The energy $W_L=\frac{1}{2}L.i_1^2$ still stored in the coil L reaches the series arrangement of C and $C_s$ by a production of oscillations $U_Z$ (FIG. 2e). The capacitance $C_s$ is constituted by switching-, tube-, coil- and ignition electrode capacitances. $C_s$ is small with respect to C, so that the capacitance of the series arrangement of C and $C_s$ is substantially equal to the capacitance $C_s$.

Figure 3:
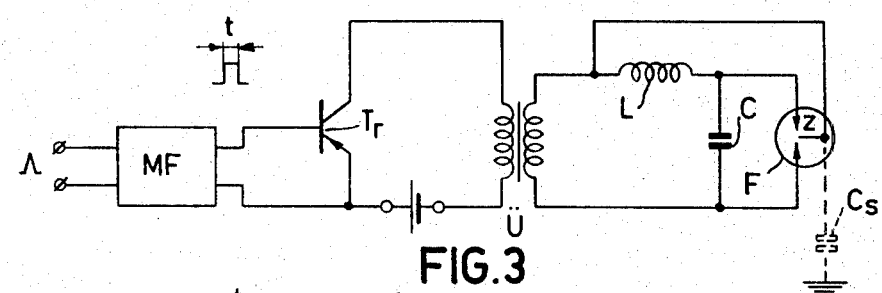
FIG. 3 is a circuit arrangement with a transistor.

In principle, transistors and thyristors may be used as control elements. FIG. 3 shows the principal circuit with a transistor T$r$. In this case a transformer U ensures the adaptation of the operating voltage of the transistor to the desired operating voltage at the capacior C. The charging choke coil L is connected in the secondary circuit, so that the ignition voltage at the junction of the secondary winding and the coil L is obtained in the cut-off condition when the transistor is switched.

When a thyristor is applied, the switching-off is effected when the thyristor conveys a comparatively small current. This switching-off of a comparatively small current can be reached in known manner already in the normally used types of thyristors by a negative pulse at the control electrode. In any case, switching-off is possible with special thyristors, the so-called silicon gate controlled switches.

Figure 4:
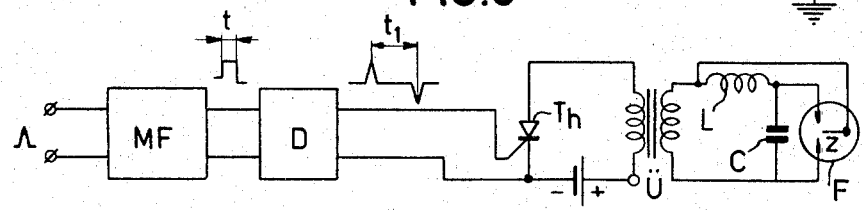
FIG. 4 is a circuit arrangement with a thyristor.

Consequently, for controlling, in place of a pulse of a duration $t_1$ is used the succession of a positive and a negative trigger pulse with a time distance $t_1$. Such a circuit is shown in FIG. 4. In this figure D denotes a differentiating member and T$h$ is the thyristor. The remaining elements correspond to those of FIG. 3.

Figure 5:
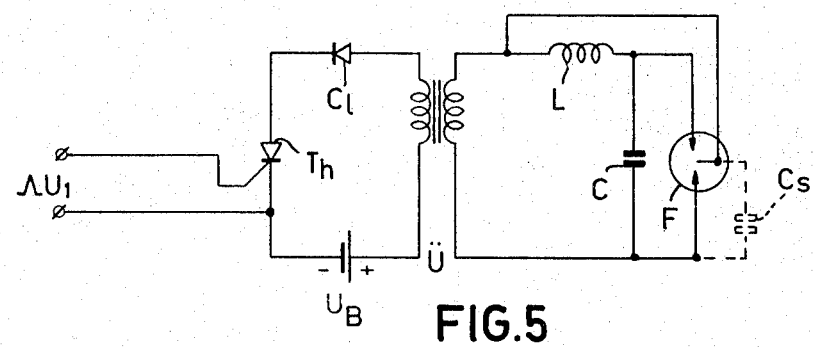
FIG. 5 is a modification of the circuit arrangement shown in FIG. 4.

When only a very small ignition energy is required, a switching-off pulse is not needed. In this case, the reverse current required for cutting-off the thyristor is used. The thyristor T$h$ cuts-off in known manner without switching-off pulse only when it conveys a reverse current. The said reverse current, which is only a fraction of the maximum current, is then interrupted suddenly. A corresponding circuit arrangement is shown in FIG. 5. For the voltage $U_s$ at the secondary winding of the transformer U it holds $$U_c+L\cdot\frac{di_L}{dt}$$

wherein $U_c$ is the voltage at the capacitor C.

During the charging time:

$U_c=\ddot{u}.U_B(1-\cos \omega t)$ and $i_L=\hat{I}_L.\sin \omega t$ ($\ddot{u}$=turns ratio of the transformer) with $\omega L.\hat{I}=\ddot{u}.U_B$ becomes: $U_c=\ddot{u}.U_B$, where $U_B$ is the voltage of the source $V_B$.

If now the time variation of $i_L$ changes in that the thyristor cuts-off, $U_s$ becomes larger than $\ddot{u}.U_B$. At the instant of switching off $U_c\approx2.\ddot{u}.U_B$. Even when the cutting-off of the thyristor occurs in the passage through zero of the current, the voltage $U_s$ increases namely at $di_L/dt=0$ to the double value: $U_s\approx2.\ddot{u}.U_B$. If the cutting-off of the thyristor occurs as explained above, however, $di_L/dt$ becomes $>0$ during the switching-off operation and consequently the voltage $U_s$ becomes larger than $2.\ddot{u}.U_B$. So the excessive voltage to be used for an ignition is formed. When as result of this the danger exists that the thyristor T$h$ becomes overloaded with respect to the cut-off voltage, a cut-off voltage-free diode G1 is connected in series with it.

Figure 6A:
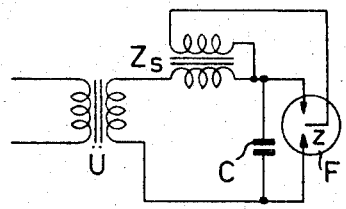
FIGS. 6a and 6b are further modifications of the triggered discharge circuit arrangement.
Figure 6B:
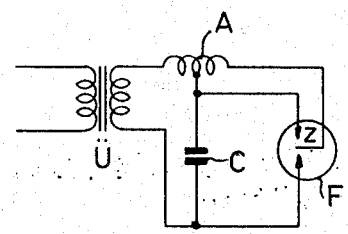

When a particularly high ignition voltage is required, the charge choke coil L may be constructed as an ignition transformer. It contains either a separate secondary winding $Z_s$, as shown in FIG. 6a, or a winding in the circuit of an autotransformer A as shown in FIG. 6b. In this case the excessive voltage is obtained by the increase of the time leak of the current during the switching-off operation.

What is claimed is:

1. A circuit arrangement for the triggered discharge of a capacitor through a gaseous discharge device, said device including first and second main electrodes, and an ignition electrode, said capacitor being connected across said first and second electrodes, comprising, switching means, a choke coil series connected with said switching means, said coil and said switching means connected in parallel with said capacitor, means coupling said ignition electrode to said choke coil, said switching means including means for charging said capacitor, and means for interrupting the flow of charge current to said capacitor a short period of time before said capacitor reaches its maximum charge.

2. A circuit arrangement as claimed in claim 1 wherein an ignition pulse produced by said interruption of the flow of charge current is derived from the charging choke coil through a transformer.

3. A circuit arrangement as claimed in claim 2 wherein said pulse deriving transformer is an autotransformer.

4. A circuit arrangement as claimed in claim 1 wherein said switching means includes a transformer having a primary and a secondary winding, means connecting said capacitor and gas discharge device to secondary winding, a thyristor connected across said primary winding, said thyristor including a gating electrode, a source of pulses, means differentiating said pulses, and means applying said differentiated pulses to the gate electrode of said thyristor.

5. A circuit arrangement as claimed in claim 4 wherein a rectifier is connected in the primary circuit of said transformer.

References Cited

UNITED STATES PATENTS

| | | | |
|---|---|---|---|
| 2,930,935 | 3/1960 | Martin | 315—241 |
| 3,134,066 | 5/1964 | Townsend | 315—241 |
| 3,176,158 | 3/1965 | Guignard | 328—67 |
| 3,211,964 | 10/1965 | Thorne | 307—88.5 |

JOHN W. HUCKERT, *Primary Examiner.*

JERRY D. CRAIG, *Assistant Examiner.*